L. PENWELL.
AUTOMOBILE FENCE CROSSING.
APPLICATION FILED DEC. 17, 1917.
1,257,633.
Patented Feb. 26, 1918.
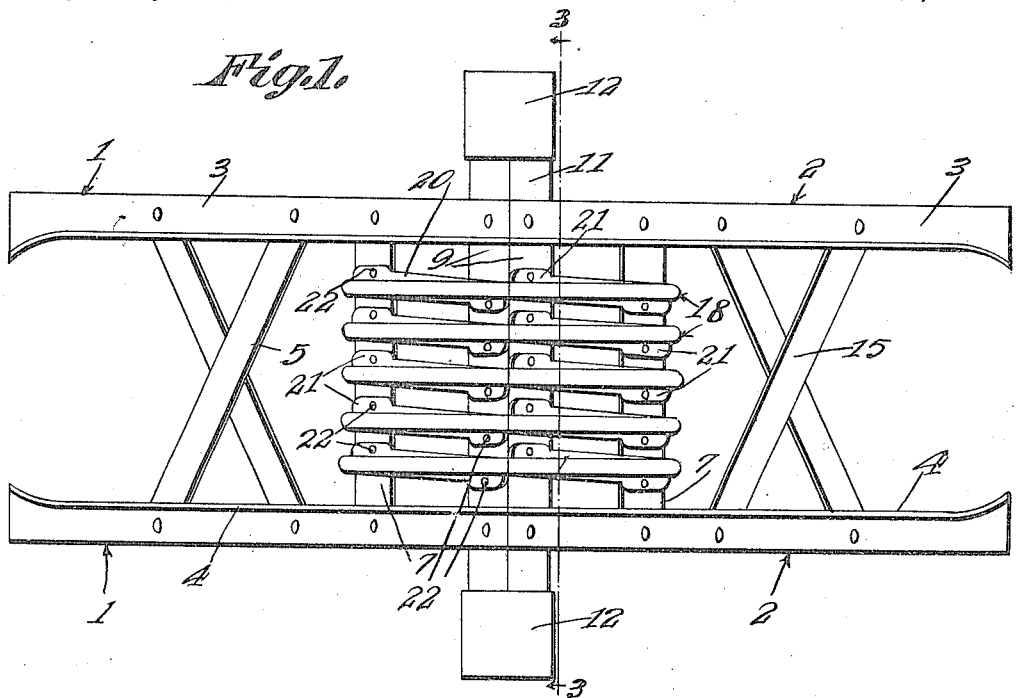
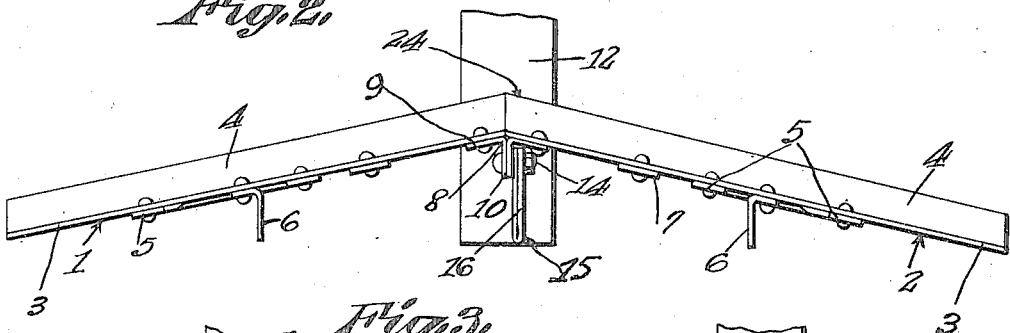
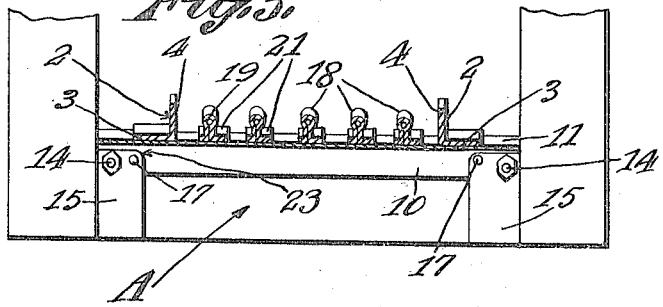
Witness
Inventor
Lewis Penwell
By Chnow & Co.
Attorneys

UNITED STATES PATENT OFFICE.

LEWIS PENWELL, OF HELENA, MONTANA.

AUTOMOBILE FENCE-CROSSING.

1,257,633.                    Specification of Letters Patent.      Patented Feb. 26, 1918.

Application filed December 17, 1917. Serial No. 207,583.

*To all whom it may concern:*

Be it known that I, LEWIS PENWELL, a citizen of the United States, residing at Helena, in the county of Lewis and Clark and State of Montana, have invented a new and useful Automobile Fence-Crossing, of which the following is a specification.

The device forming the subject matter of this application is adapted to be placed between a pair of fence posts, to prevent stock from passing therebetween, the structure being so constituted that an automobile may be driven thereover.

It is one object of the invention to provide a structure of the kind mentioned, which will exercise a double function, in that it may be traversed by an automobile, and in that it will also serve as an efficient barrier to the passage of stock.

Another object of the invention is to provide novel means for connecting the constituent tracks at the apex of the structure, and to provide novel means for assembling the legs with the body portion of the device.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:

Figure 1 shows in top plan, an automobile fence crossing constructed in accordance with the invention;

Fig. 2 is a side elevation of the device delineated in Fig. 1; and

Fig. 3 is a section taken approximately on the line 3—3 of Fig. 1.

In carrying out the present invention, there are provided oppositely slanting tracks 1 and 2 which may be angle members, each angle member including a transverse flange 3 and a vertical flange 4. The transverse flanges 3 of the angle members of the respective tracks are united by crossed braces 5, the transverse flanges carrying legs 6. At their upper ends, the tracks 1 and the tracks 2 are united, respectively, by bars 8 which may be angle members, including, each a transverse flange 9 and a depending flange 10, the flanges 9 being secured to the flanges 3 of the tracks. As shown at 11, the bars 8 project outwardly beyond the tracks 1 and 2 so as to engage with fence posts 12. In this way the tracks 1 and 2 are spaced from the posts 12 to such an extent that an automobile may traverse the tracks without any projecting portions of the automobile, such as the hubs, the body or the cover, coming into contact with the posts. Between the bars 8 and the braces 5, the tracks 1 are united by a bar 7, the tracks 2 being similarly connected, the bars 7 being attached to the transverse flanges 3 of the tracks.

Near to their ends, the depending flanges 10 of the bars 8 of the tracks 1—1 and 2—2 are united by securing elements 14 which may be bolts. Double walled legs 15 are provided, the same being made, if desired, but not necessarily, by folding a bar of metal upon itself, as shown at 16. The legs 15 are pivoted at 17 to the depending flange 10 of one bar 8, the legs being cut away at one corner as shown at 23, so that the legs can be folded upwardly and inwardly in the direction of the arrow A in Fig. 3, against the flange 9, thereby to economize space in storage and shipment. it being possible to separate the tracks 1 from the tracks 2 by removing the bolts 14. It is to be observed that the bolts 14 pass through the upper ends of the legs 15, and when the device is in use, prevent the legs from swinging on the pivot elements 17. Longitudinal cattle guards are supported by the bars 7 and by the flanges 10 of the bars 8 and are disposed close to the apex 24 formed by the tracks 1—1 and 2—2. These cattle guards 18 may be variously constructed. If made of metal, they may comprise a double walled body 19 having lateral flanges 20 terminating in transverse extended feet 21 united by securing elements 22 to the flanges 10 of the bars 8 and to the bars 7. The flanges 20 of the cattle guards 18 have their outer edges inclined in opposite directions, each flange running out to nothing at one end of the guard, this construction giving the necessary strength with a minimum expenditure of material.

In practical operation, the lower ends of the tracks 1—1 and 2—2 rest on the ground, the legs 15 bearing on the ground, between the posts 12. An automobile may traverse the tracks 1—1, 2—2, thereby passing the fence of which the posts 12 constitute a part, but stock will not surmount the structure and pass through the fence, because the device includes the cattle guards 18. The structure is of small height, measured vertically at its apex 24, and an automobile may ride over the device without difficulty. The small height of the crossing, at its apex, does not detract from its efficiency as a barrier to the passage of stock, since the stock will not travel over the guards 18, even though the device is of no great height.

Having thus described the invention, what is claimed is:

1. A device of the class described, comprising oppositely slanting tracks; and longitudinal cattle guards supported between the tracks on opposite sides of the apex defined by the tracks.

2. A device of the class described, comprising oppositely slanting tracks; bars at the upper ends of the tracks; a connection uniting the bars; and a leg carried by one bar.

3. A device of the class described, comprising oppositely slanting tracks; transverse bars at the upper ends of the tracks; a connection uniting the bars; and a leg carried by the connection.

4. A device of the class described, comprising oppositely slanting tracks; transverse bars at the upper ends of the tracks; a leg pivoted to one bar; and a connection uniting the bars, the connection engaging the leg to hold the same against pivotal movement.

5. A device of the class described, comprising oppositely slanting tracks; transverse bars at the upper ends of the tracks; longitudinal cattle guards carried by the bars; a leg pivoted to one bar; and a connection uniting the bars, the connection engaging the leg to hold the same against pivotal movement.

In testimony that I claim the foregoing as my own, I have hereto affixed my signature in the presence of a witness.

LEWIS PENWELL.

Witness:
CLARENCE L. JACKSON.